United States Patent
Luo et al.

(10) Patent No.: US 8,490,121 B1
(45) Date of Patent: Jul. 16, 2013

(54) SLIM-TYPE OPTICAL DISC DRIVE

(75) Inventors: Yuan-Syun Luo, Hsinchu (TW);
Chih-Ming Yang, Hsinchu (TW);
Chia-Chun Wei, Hsinchu (TW);
In-Shuen Lee, Hsinchu (TW)

(73) Assignee: Philips & Lite-on Digital Solutions Corporation, Taipei (TW)

( * ) Notice: Subject to any disclaimer, the term of this patent is extended or adjusted under 35 U.S.C. 154(b) by 0 days.

(21) Appl. No.: 13/441,111

(22) Filed: Apr. 6, 2012

(30) Foreign Application Priority Data

Jan. 18, 2012 (CN) .......................... 2012 1 0016473

(51) Int. Cl.
*G11B 17/04* (2006.01)
(52) U.S. Cl.
USPC ........................................................ 720/602
(58) Field of Classification Search
USPC .................. 720/602, 613, 610, 648, 621, 659, 720/619
See application file for complete search history.

(56) References Cited

U.S. PATENT DOCUMENTS

| 3,690,587 | A  | * | 9/1972 | Kitazawa | 242/333 |
| 6,771,457 | B2 | * | 8/2004 | Flaherty et al. | 360/92.1 |
| 8,194,365 | B1 | * | 6/2012 | Leng et al. | 360/324.12 |
| 2008/0231988 | A1 | * | 9/2008 | Nave et al. | 360/92.1 |
| 2011/0235209 | A1 | * | 9/2011 | Minemura | 360/92.1 |

* cited by examiner

*Primary Examiner* — Allen T Cao
(74) *Attorney, Agent, or Firm* — WPAT, PC; Justin King

(57) ABSTRACT

A slim-type optical disc drive includes a casing and a tray. A first circuit board is disposed within the casing. A second circuit board is disposed on the tray. A spring switch is disposed on the second circuit board. A first end of the spring switch is fixed on the second circuit board. A resistor is connected between the first end of the spring switch and a first power source. A second end of the spring switch is extended outside the second circuit board. In a tray-out status, the second end of the spring switch is not contacted with any object, so that a first status signal is generated. In a tray-in status, the second end of the spring switch is contacted with a conducting zone of a second power source, so that a second status signal is generated.

8 Claims, 5 Drawing Sheets

SLIM-TYPE OPTICAL DISC DRIVE

This application claims the benefit of People's Republic of China Application Serial No. 201210016473.1, filed Jan. 18, 2012, the subject matter of which is incorporated herein by reference.

FIELD OF THE INVENTION

The present invention relates to a component of an optical disc drive, and more particularly to a switch structure of a slim-type optical disc drive.

BACKGROUND OF THE INVENTION

FIG. 1 is a schematic view illustrating the inner portion of a conventional slim-type optical disc drive. As shown in FIG. 1, the slim-type optical disc drive comprises a tray 110, a casing 112, and two sliding rails 140, 142. After the tray 110 is pushed into casing 112 of the optical disc drive, the tray 110 is fixed within the casing 112 by a locking unit (not shown). Under this circumstance, the tray 110 is in a tray-in status. Whereas, after an eject button on the tray 110 is pressed by the user, the locking unit will release the tray 110 and the tray 110 will be withdrawn from the optical disc drive. Under this circumstance, the tray 110 is in a tray-out status. In other words, if the tray 110 is not stored within the casing 112 and the optical disc drive is in the tray-out status, the tray 110 may be pulled out along the rails 140 and 142. After the tray 110 is pulled out, the optical disc loaded into the tray 110 may be replaced or the tray 110 may be pushed into the casing 112 (i.e. in the tray-in status).

Moreover, a daughter board (not shown) is fixed within the tray 110. A main board 160 is fixed on the casing 112. The main board 160 and the daughter board are electrically connected with each other to transmit signals through a U-shaped flexible cable 150. In other words, during the process of moving the tray 110, the daughter board is still in communication with the main board 160.

Generally, a spindle motor 120, a spindle motor driver chip (not shown), an optical pickup head 130 and an optical pickup head control chip (not shown) are mounted on the daughter board. In addition, a variety of circuits are installed on the main board 160. These circuits include for example an analog signal microprocessor, a digital signal process (DSP)/decoder microprocessor, a flash ROM chip, a SDRAM chip, and so on. The main board 160 and the daughter board are in communication with each other through the U-shaped flexible cable 150. Moreover, since the casing 112 is made of a metallic material, the casing 112 is also electrically connected to a ground voltage (Gnd).

After the optical disc drive confirms that the tray 110 is in the tray-in status, the optical disc drive is enabled. Whereas, after the optical disc drive confirms that the optical disc drive is disabled (spindle motor 120 and optical pickup head 130 are disabled), the tray 110 may be controlled to be in the tray-out status. Moreover, the optical disc drive is usually equipped with a limit switch 162 to detect the whether the tray 110 is in the tray-out status or the tray-in status.

Please refer to FIG. 1 again. The limit switch 162 is mounted on the main board 160. When the tray 110 is fixed within the casing 112 by the locking unit, the limit switch 162 is also pressed by the tray 110. Consequently, the limit switch 162 generates a first status signal. According to the first status signal, the circuits on the main board 160 may confirm that the tray 110 is in the tray-in status, and thus the optical disc drive will be enabled. Whereas, when the tray 110 is in the tray-out state, the limit switch 162 is no longer pressed by the tray 110. Consequently, the limit switch 162 generates a second status signal. Until the limit switch 162 is pressed by the tray 110 again and the first status signal is generated, the optical disc drive will be enabled again.

FIG. 2A is a schematic circuit diagram illustrating a first type of conventional limit switch. FIG. 2B is a schematic circuit diagram illustrating a second type of conventional limit switch. As shown in FIG. 2A, in a case that a touch terminal A of the limit switch 162 is not pressed, the second status signal at a high voltage level (Vcc) is outputted from an output terminal Out of the limit switch 162. Whereas, in a case that the touch terminal A of the limit switch 162 is pressed, the first status signal at a low voltage level (Gnd) is outputted from the output terminal Out of the limit switch 162.

As shown in FIG. 2B, in a case that a touch terminal A of the limit switch 162 is not pressed, the second status signal at the low voltage level (Gnd) is outputted from an output terminal Out of the limit switch 162. Whereas, in a case that the touch terminal A of the limit switch 162 is pressed, the first status signal at the high voltage level (Vcc) is outputted from the output terminal Out of the limit switch 162.

From the above discussions, the limit switch 162 is an important component of the optical disc drive for detecting whether the optical disc drive is in the tray-out status or the tray-in status. However, since the limit switch 162 is not cost-effective, it is necessary to provide another component to replace the limit switch 162.

SUMMARY OF THE INVENTION

A first embodiment of the present invention provides a slim-type optical disc drive. The slim-type optical disc drive includes a casing and a tray. A first circuit board is disposed within the casing. The tray is selectively accommodated within the casing or withdrawn from the casing. A second circuit board is disposed on the tray. A spring switch is disposed on the second circuit board. A first end of the spring switch is fixed on the second circuit board. A resistor is connected between the first end of the spring switch and a first power source. The first end of the spring switch is served as an output terminal of the spring switch. A second end of the spring switch is extended outside the second circuit board. In a tray-out status, the second end of the spring switch is not contacted with any object, so that a first status signal is generated from the output terminal of the spring switch. In a tray-in status, the second end of the spring switch is contacted with a conducting zone of a second power source, so that a second status signal is generated from the output terminal of the spring switch.

A second embodiment of the present invention provides a slim-type optical disc drive. The slim-type optical disc drive includes a casing and a tray. A first circuit board is disposed within the casing. A spring switch is disposed on the first circuit board. A first end of the spring switch is fixed on the first circuit board. A resistor is connected between the first end of the spring switch and a first power source. The first end of the spring switch is served as an output terminal of the spring switch. A second end of the spring switch is extended outside the first circuit board. The tray is selectively accommodated within the casing or withdrawn from the casing, wherein a second circuit board is disposed on the tray. In a tray-out status, the second end of the spring switch is not contacted with any object, so that a first status signal is generated from the output terminal of the spring switch. In a tray-in status, the second end of the spring switch is contacted with a conducting zone of a second power source, so that a second status signal is generated from the output terminal of the spring switch.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
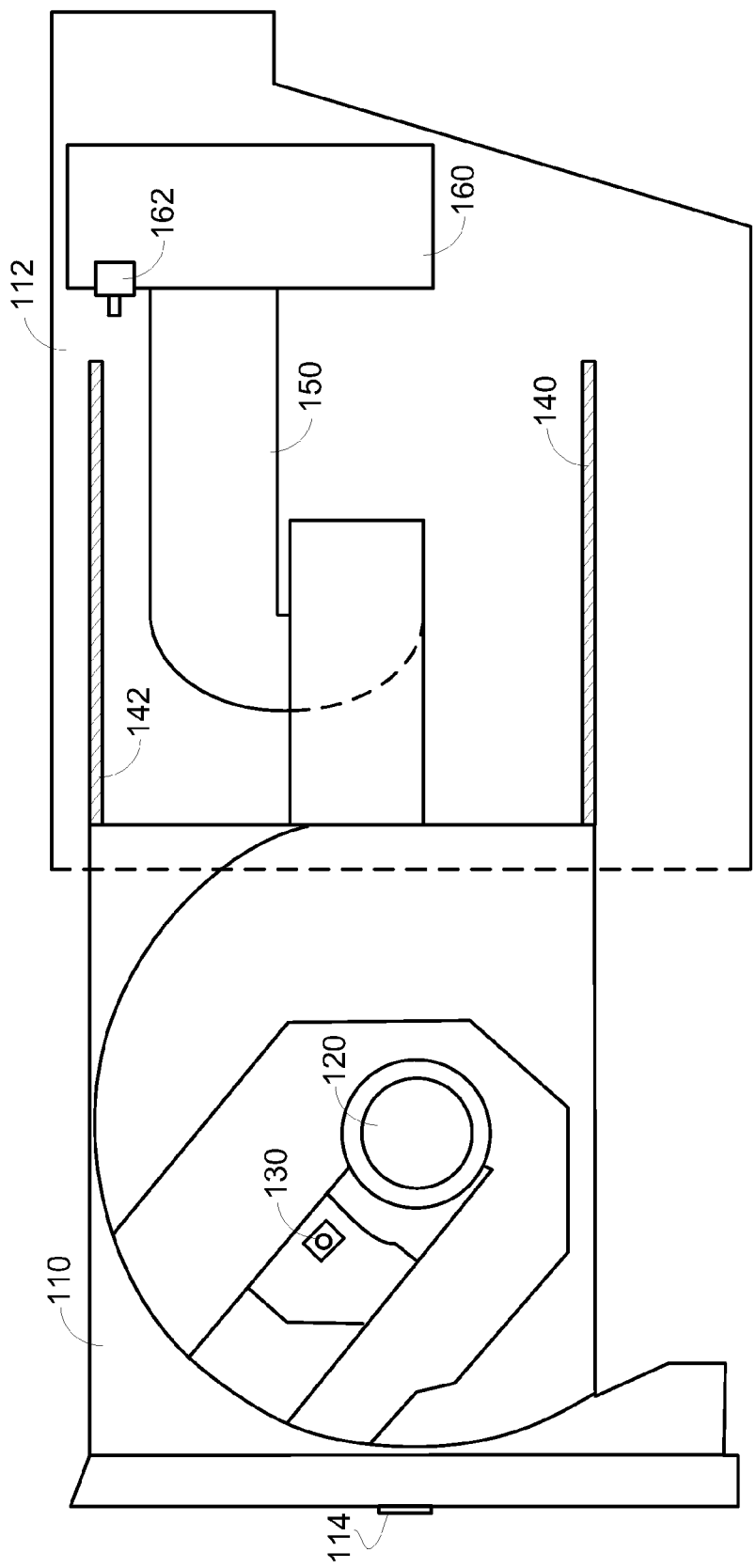
FIG. 1 (prior art) is a schematic view illustrating the inner portion of a conventional slim-type optical disc drive.
Figure 2A:
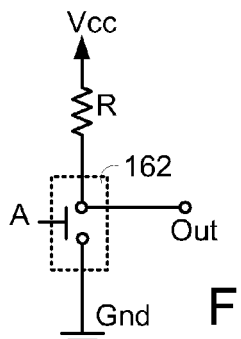
FIG. 2A (prior art) is a schematic circuit diagram illustrating a first type of conventional limit switch.
Figure 2B:
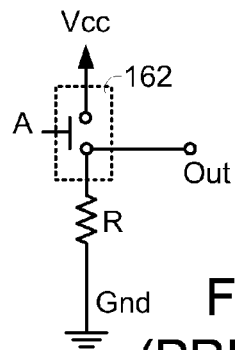
FIG. 2B (prior art) is a schematic circuit diagram illustrating a second type of conventional limit switch.

The present invention provides a slim-type optical disc drive. In comparison with the conventional optical disc drive, the relationship between the main board and the daughter board of the optical disc drive of the present invention is distinguished. The configurations of the other components (e.g. the tray 110, the eject button 114, the sliding rails 140, 142, and the casing 112) are similar to those of the conventional optical disc drive, and are not redundantly described herein. Moreover, for clarification and brevity, only the daughter board of the tray 110 is shown but the spindle motor and the optical pickup head are not shown in the drawings.

In accordance with a key feature of the present invention, a cost-effective spring switch is employed to replace the function of the limit switch of the conventional optical disc drive in order to detect the operating status of the tray.

Figure 3A:
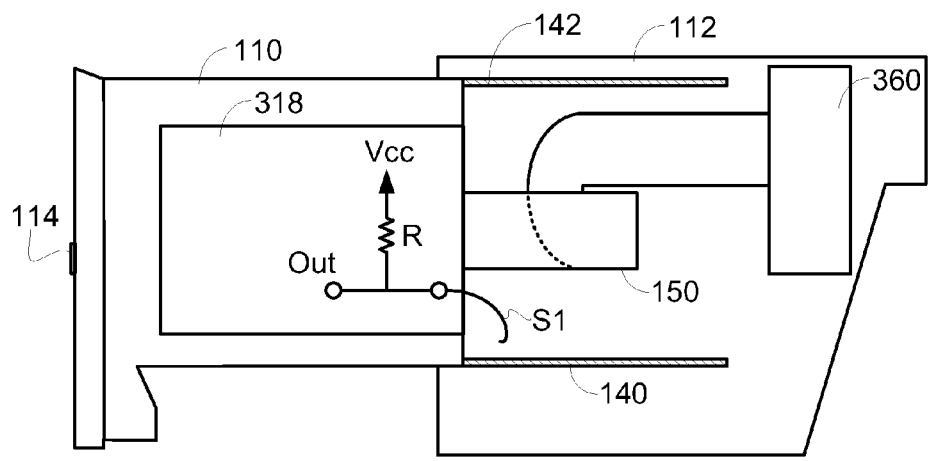
FIGS. 3A and 3B schematically illustrate a circuit for detecting the operating status of the tray of the optical disc drive according to a first embodiment of the present invention.
Figure 3B:
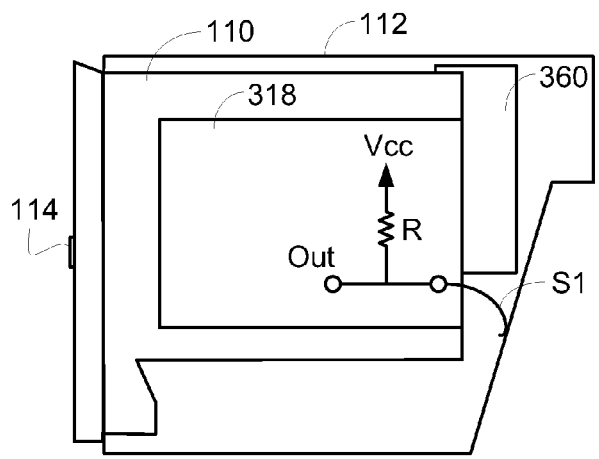

FIGS. 3A and 3B schematically illustrate a circuit for detecting the operating status of the tray of the optical disc drive according to a first embodiment of the present invention. A spring switch S1 is disposed on the daughter board 318. A first end of the spring switch S1 is fixed on the daughter board 318. A resistor R is connected between the first end of the spring switch S1 and a source voltage Vcc. In addition, the first end of the spring switch S1 is also served as the output terminal Out of the spring switch S1. A second end of the spring switch S1 is suspended and extended outside the daughter board 318. As shown in FIG. 3A, in a case that the tray 110 is in the tray-out status, the second end of the spring switch S1 is not contacted with any object. Meanwhile, a first status signal (e.g. a high voltage level) is outputted from the output terminal Out of the spring switch S1.

Whereas, as shown in FIG. 3B, in a case that the tray is in the tray-in status, the second end of the spring switch S1 is contacted with an inner surface of the casing 112. Since the casing 112 is connected to a ground voltage (Gnd), a second status signal (e.g. a low voltage level) is outputted from the output terminal Out of the spring switch S1. Moreover, the first status signal or the second status signal outputted from the output terminal of the spring switch S1 may be transmitted to the main board 360 through the U-shaped flexible cable 150. According to the first status signal or the second status signal, the optical disc drive may judge whether the tray 110 is in the tray-out status or the tray-in status.

Figure 4A:
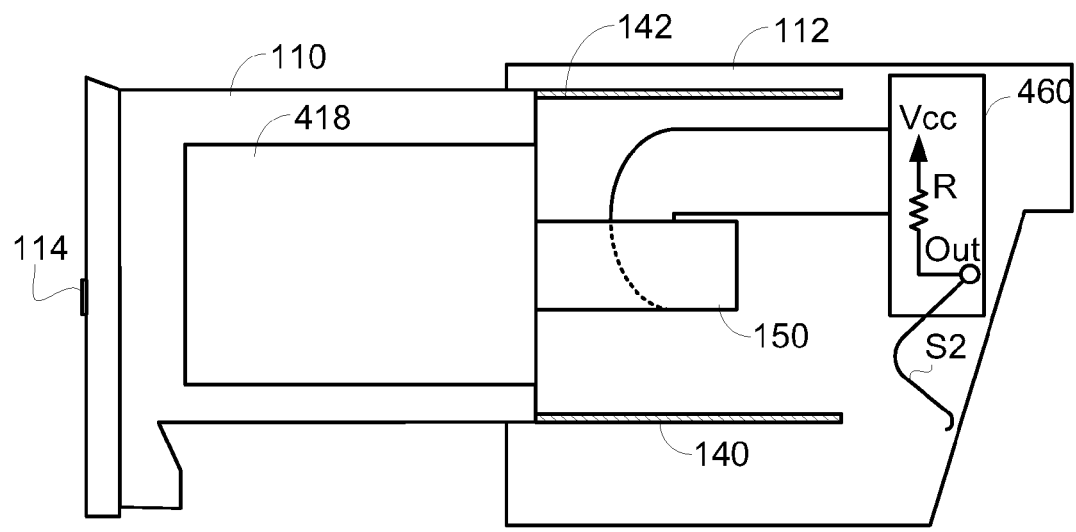
FIGS. 4A and 4B schematically illustrate a circuit for detecting the operating status of the tray of the optical disc drive according to a second embodiment of the present invention.
Figure 4B:
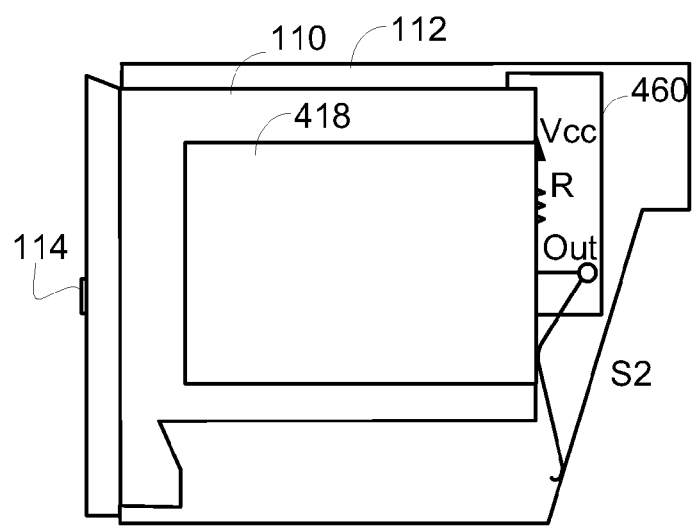

FIGS. 4A and 4B schematically illustrate a circuit for detecting the operating status of the tray of the optical disc drive according to a second embodiment of the present invention. A spring switch S2 is disposed on the main board 460. A first end of the spring switch S2 is fixed on the main board 460. A resistor R is connected between the first end of the spring switch S2 and a source voltage Vcc. In addition, the first end of the spring switch S2 is also served as the output terminal Out of the spring switch S2. A second end of the spring switch S2 is suspended and extended outside the main board 460. As shown in FIG. 4A, in a case that the tray 110 is in the tray-out status, the second end of the spring switch S2 is not contacted with any object. Meanwhile, a first status signal (e.g. a high voltage level) is outputted from the output terminal Out of the spring switch S2.

Whereas, as shown in FIG. 4B, in a case that the tray is in the tray-in status, the second end of the spring switch S2 is compressed by the tray 110 and contacted with an inner surface of the casing 112. Since the casing 112 is connected to a ground voltage (Gnd), a second status signal (e.g. a low voltage level) is outputted from the output terminal Out of the spring switch S2. According to the first status signal or the second status signal, the optical disc drive may judge whether the tray 110 is in the tray-out status or the tray-in status. It is noted that the part of the tray 110 to compress the spring switch S2 is made of a non-conductive material (e.g. a plastic material).

Figure 5A:
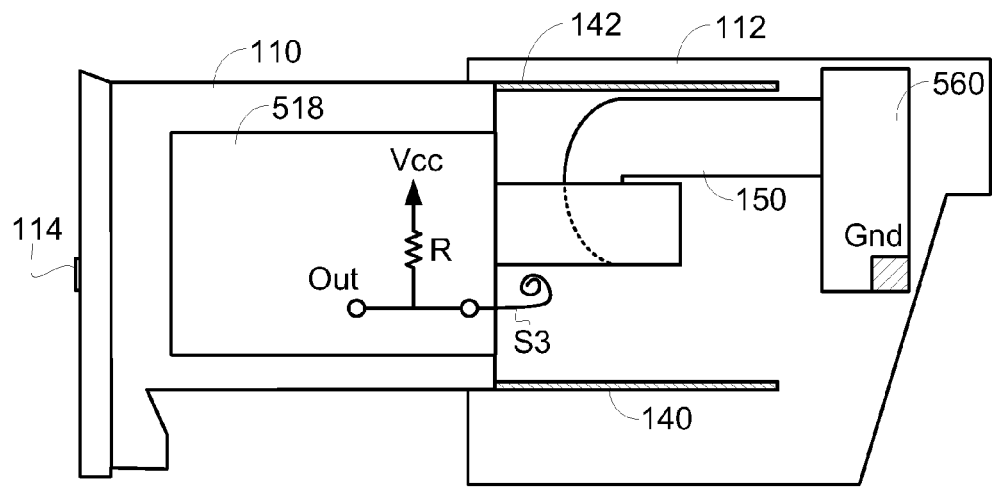
FIGS. 5A and 5B schematically illustrate a circuit for detecting the operating status of the tray of the optical disc drive according to a third embodiment of the present invention.
Figure 5B:
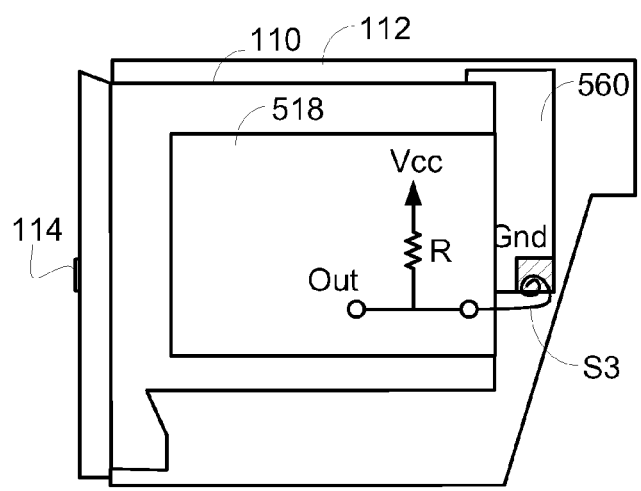

FIGS. 5A and 5B schematically illustrate a circuit for detecting the operating status of the tray of the optical disc drive according to a third embodiment of the present invention. A spring switch S3 is disposed on the daughter board 518. A first end of the spring switch S3 is fixed on the daughter board 518. A resistor R is connected between the first end of the spring switch S3 and a source voltage Vcc. In addition, the first end of the spring switch S3 is also served as the output terminal Out of the spring switch S3. A second end of the spring switch S3 is suspended and extended outside the daughter board 518. As shown in FIG. 5A, in a case that the tray 110 is in the tray-out status, the second end of the spring switch S3 is not contacted with any object. Meanwhile, a first status signal (e.g. a high voltage level) is outputted from the output terminal Out of the spring switch S3.

Whereas, as shown in FIG. 5B, in a case that the tray is in the tray-in status, the second end of the spring switch S3 is contacted with a conducting zone of the main board 560 in order to receive a ground voltage (Gnd). Meanwhile, a second status signal (e.g. a low voltage level) is outputted from the output terminal Out of the spring switch S3. Moreover, the first status signal or the second status signal outputted from the output terminal of the spring switch S3 may be transmitted to the main board 560 through the U-shaped flexible cable 150. According to the first status signal or the second status signal, the optical disc drive may judge whether the tray 110 is in the tray-out status or the tray-in status.

However, those skilled in the art will readily observe that numerous modifications and alterations of the third embodiment may be made while retaining the teachings of the invention. For example, the spring switch S3 may be disposed on the main board 560, and the daughter board 518 may be equipped with a conducting zone having the ground voltage (Gnd). In such configuration, the purpose of detecting the operating status of the tray 110 is also achieved.

Figure 6A:
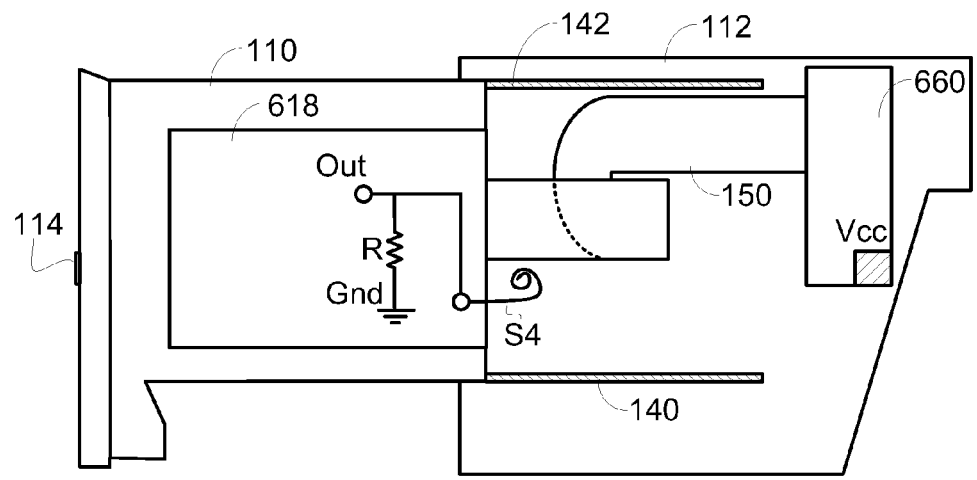
FIGS. 6A and 6B schematically illustrate a circuit for detecting the operating status of the tray of the optical disc drive according to a fourth embodiment of the present invention.
Figure 6B:
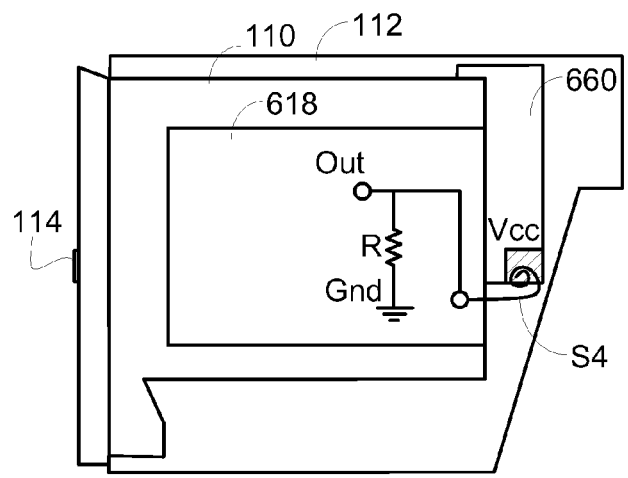

FIGS. 6A and 6B schematically illustrate a circuit for detecting the operating status of the tray of the optical disc drive according to a fourth embodiment of the present invention. A spring switch S4 is disposed on the daughter board 618. A first end of the spring switch S4 is fixed on the daughter board 618. A resistor R is connected between the first end of the spring switch S4 and a ground voltage Gnd. In addition, the first end of the spring switch S4 is also served as the output terminal Out of the spring switch S4. A second end of the spring switch S4 is suspended and extended outside the daughter board 618. As shown in FIG. 6A, in a case that the tray 110 is in the tray-out status, the second end of the spring switch S4 is not contacted with any object. Meanwhile, a first status signal (e.g. a low voltage level) is outputted from the output terminal Out of the spring switch S4.

Whereas, as shown in FIG. 6B, in a case that the tray is in the tray-in status, the second end of the spring switch S4 is contacted with a conducting zone of the main board 660 in order to receive a source voltage Vcc. Meanwhile, a second status signal (e.g. a high voltage level) is outputted from the output terminal Out of the spring switch S4. Moreover, the first status signal or the second status signal outputted from the output terminal of the spring switch S4 may be transmitted to the main board 660 through the U-shaped flexible cable 150. According to the first status signal or the second status signal, the optical disc drive may judge whether the tray 110 is in the tray-out status or the tray-in status.

However, those skilled in the art will readily observe that numerous modifications and alterations of the fourth embodiment may be made while retaining the teachings of the invention. For example, the spring switch S4 may be disposed on the main board 660, and the daughter board 618 may be equipped with a conducting zone having the source voltage Vcc. In such configuration, the purpose of detecting the operating status of the tray 110 is also achieved.

From the above description, the limit switch used in the conventional optical disc drive is replaced by the cost-effective spring switch of the optical disc drive of the present invention. Consequently, the fabricating cost of the optical disc drive is reduced while achieving the purpose of detecting the operating status of the tray.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A slim-type optical disc drive, comprising:
    a casing, wherein a first circuit board is disposed within the casing; and
    a tray selectively accommodated within the casing or withdrawn from the casing, wherein a second circuit board is disposed on the tray, a spring switch is disposed on the second circuit board, a first end of the spring switch is fixed on the second circuit board, a resistor is connected between the first end of the spring switch and a first power source, the first end of the spring switch is served as an output terminal of the spring switch, and a second end of the spring switch is extended outside the second circuit board,
    wherein in a tray-out status, the second end of the spring switch is not contacted with any object, so that a first status signal is generated from the output terminal of the spring switch, wherein in a tray-in status, the second end of the spring switch is contacted with a conducting zone of a second power source, so that a second status signal is generated from the output terminal of the spring switch.

2. The slim-type optical disc drive as claimed in claim 1, wherein the first power source is a source voltage, the second power source is a ground voltage, the casing is a metallic casing, and the conducting zone of the second power source is the metallic casing with the ground voltage.

3. The slim-type optical disc drive as claimed in claim 1, wherein the first power source is a source voltage, the second power source is a ground voltage, and the conducting zone of the second power source is disposed on the first circuit board and has the ground voltage.

4. The slim-type optical disc drive as claimed in claim 1, wherein the first power source is a ground voltage, the second power source is a source voltage, and the conducting zone of the second power source is disposed on the first circuit board and has the source voltage.

5. A slim-type optical disc drive, comprising:
    a casing, wherein a first circuit board is disposed within the casing, a spring switch is disposed on the first circuit board, a first end of the spring switch is fixed on the first circuit board, a resistor is connected between the first end of the spring switch and a first power source, the first end of the spring switch is served as an output terminal of the spring switch, and a second end of the spring switch is extended outside the first circuit board; and
    a tray selectively accommodated within the casing or withdrawn from the casing, wherein a second circuit board is disposed on the tray,
    wherein in a tray-out status, the second end of the spring switch is not contacted with any object, so that a first status signal is generated from the output terminal of the spring switch, wherein in a tray-in status, the second end of the spring switch is contacted with a conducting zone of a second power source, so that a second status signal is generated from the output terminal of the spring switch.

6. The slim-type optical disc drive as claimed in claim 5, wherein the first power source is a source voltage, the second power source is a ground voltage, the casing is a metallic casing, and the conducting zone of the second power source is the metallic casing with the ground voltage.

7. The slim-type optical disc drive as claimed in claim 5, wherein the first power source is a source voltage, the second power source is a ground voltage, and the conducting zone of the second power source is disposed on the second circuit board and has the ground voltage.

8. The slim-type optical disc drive as claimed in claim 5, wherein the first power source is a ground voltage, the second power source is a source voltage, and the conducting zone of the second power source is disposed on the second circuit board and has the source voltage.

\* \* \* \* \*